United States Patent [19]

Welsh

[11] 4,448,143

[45] May 15, 1984

[54] SAIL CRADLE

[76] Inventor: Richard J. Welsh, 460 NE. 105 St., Miami Shores, Fla. 33138

[21] Appl. No.: 343,100

[22] Filed: Jan. 27, 1982

Related U.S. Application Data

[63] Continuation-in-part of Ser. No. 119,387, Feb. 7, 1980, abandoned.

[51] Int. Cl.$^3$ .............................................. B63B 15/00
[52] U.S. Cl. ..................................... 114/90; 114/99; 114/364; 114/221 R; 248/538
[58] Field of Search ...................... 114/221 R, 223, 90, 114/91, 93, 94, 99, 102, 104, 105, 106, 107, 108, 352, 353, 354, 364; 224/273, 35, 36, 39; 248/534, 538

[56] References Cited

U.S. PATENT DOCUMENTS

| | | | |
|---|---|---|---|
| 840,198 | 1/1907 | Burgoyne | 114/39 |
| 2,157,186 | 5/1939 | Pinter, Sr. et al. | 114/353 |
| 3,827,386 | 8/1974 | Faden | 114/91 |
| 3,838,655 | 10/1974 | Kratz | 114/39 |
| 3,861,731 | 1/1975 | Young | 114/221 R |
| 4,194,458 | 3/1980 | Messing | 114/39 |

FOREIGN PATENT DOCUMENTS

| | | | |
|---|---|---|---|
| 651980 | 7/1937 | Fed. Rep. of Germany | 114/90 |
| 580246 | 2/1946 | United Kingdom | 114/99 |

Primary Examiner—Trygve M. Blix
Assistant Examiner—Thomas J. Brahan
Attorney, Agent, or Firm—John Cyril Malloy

[57] ABSTRACT

This invention is a removable and buoyant sail cradle for use on small sailboats having detachable masts and booms such as the commercially available AMF All-Court Sunfish such that the sail cradle has a stem having a hollow first end which inserts within the mast hole of a sailboat after the mast has been removed where the first end has an upper and lower portion such that the lower portion is watertightly sealed by an inserted cap and the upper portion is sealed by a second end of the sail cradle where the second end extends above the deck and has a cradle portion has a C-type ring having the open portion facing away from the stem and upward for captivating receipt of the detached mast, boom and furled sail above the deck of a sailboat while in transit. The device also doubles in utility as a sealed flotation device in the event that the boat is capsized while in use.

1 Claim, 5 Drawing Figures

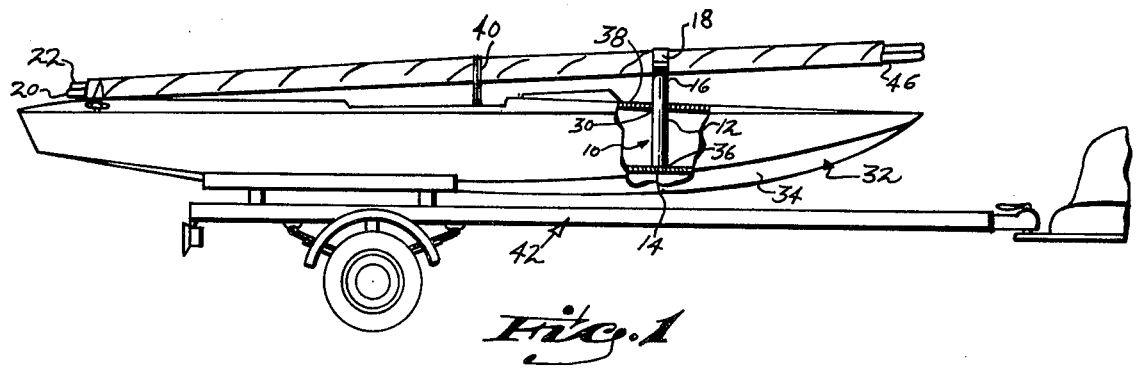
Fig. 1
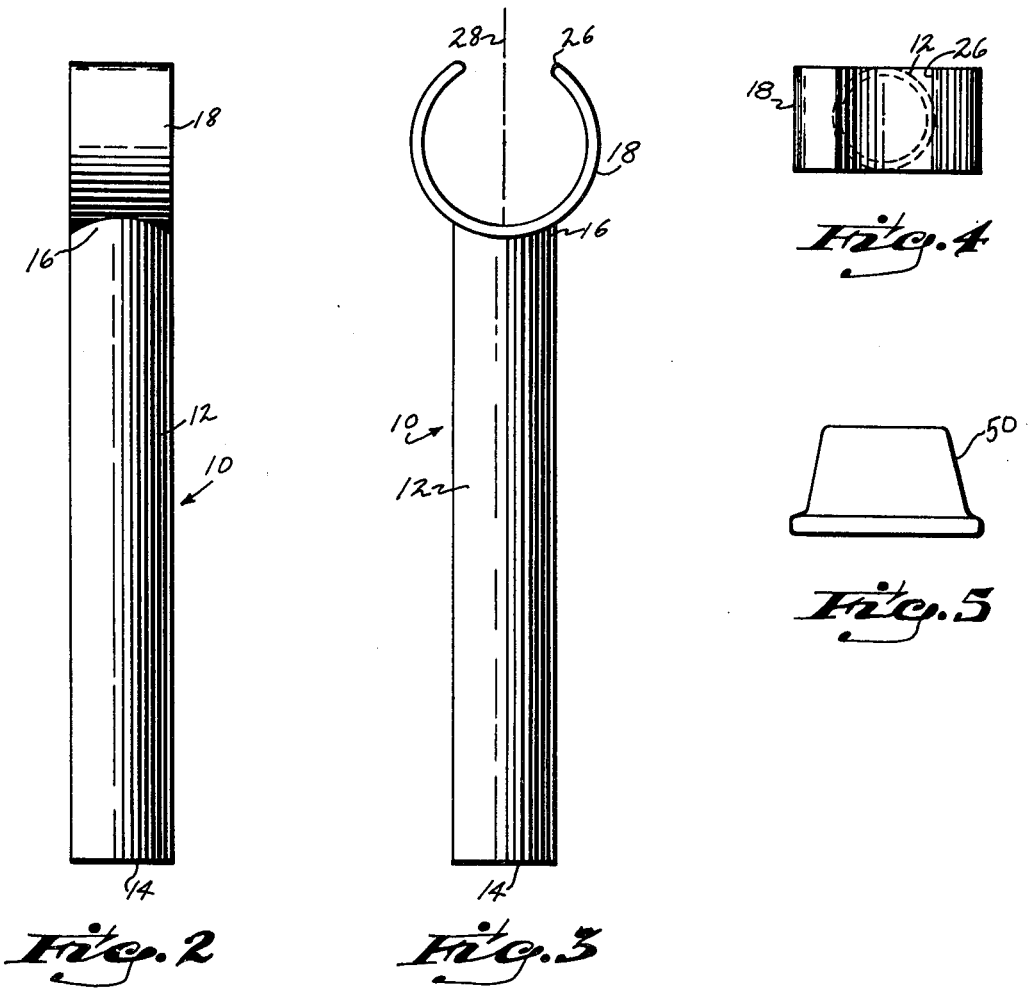
Fig. 2  Fig. 3
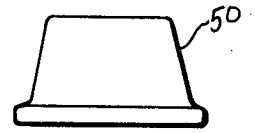
Fig. 4
Fig. 5

SAIL CRADLE

This application is a continuation-in-part of my prior patent application, Ser. No. 119,387 filed on Feb. 7, 1980, now abandoned.

FIELD OF THE INVENTION

This invention relates to small sailboats which have removable masts such as the current commercially available AMF All-Court Sunfish, and more particularly relates to a removable structure for carrying a boom and mast along with the furled sails which have all been detached from the hull for transporting.

BACKGROUND OF THE INVENTION

The increase in the popularity of sailboats has given rise to the advent of smaller and more material efficient models. With the development of the smaller sailboats such as the AMF All-Court Sunfish, has come the recurring problem of damage to the deck surface and a new problem of damage to the lightweight and fragile materials of which the attachments to the deck are composed when the sailboat is in transit. The problems have been caused by the lashing of the detachable mast, boom and furled sail to the deck and have resulted in the chafing and chipping of the paint on the deck, loosening of the rivets of the splash rail, and, bending and/or deflection of the mast.

In the past, these problems were purportedly solved by the use of various types of folding masts which were fixed to the deck by some means. The problems with these devices is accentuated in the smaller sailboats where space, weight, and cost are at a premium. In order to appreciate the problems posed by the folding masts, consider the facts that extra materials must be added to a mast in order to provide for folding. This material includes metal joints: (1) which corrode in the case of most materials and are heavy; (2) aluminum is soft and not generally durable; and (3) stainless steel, although non-corrosive is heavy. Furthermore, in order to provide for folding, smaller mast segments are attached together which reduces the advantage of the choice of mast materials in terms of flexibility. Flexibility of the mast becomes increasingly important for smaller sailboats since this feature will greatly effect the smoothness of sailing in the ocean and over choppy water. In addition, it is anticipated that the tip of the mast and even part of the sail may be submerged temporarily, particularly when a small boat is used in the ocean. Under such circumstances, the mast must be both flexible and strong in order to be able to maintain a seblance of an upright posture of the sailboat without capsizing and also allow the mast time to return above the surface of the water before fracturing.

As a result particularly of lack of space and weight, the detachable mast, boom, and sail is the only realistic and most efficient solution to the competing needs of the small sailboat. The applicant has solved the problems which have been spawned by the lashing of the detachable mast and rigging to the deck by inventing a device wherein the pressure from the sail, boom, and mast in the furled position is relieved from the splash rail by a supporting member comprising a stem and a cradle having a "C" opening facing upwardly wherein the furled boom, sail and mast are tied down and then captivatingly held in place by a stem having a cradle portion with an open "C" portion captivatingly engaging the furled members and relieving the pressure from the deck.

Additionally, the device aids in the transportation of the boom, sail and mast by holding the members in place through the cradle portion to prevent damage from wind due to transportation and the like.

Further, the painted surfaces of the deck and the like are saved by removing the furled members from the deck. Additionally, the main tie down may be eliminated and it is consequently easier for transportation. Additionally the bowing or bending of the mast, sail and boom during normal transportation is eliminated since the stem may be inserted in the mast hole creating a secure tie down for the members to the boat during transportation.

Secondly, it is recognized that the danger inherrent in sailing is that of capsizing. As such capsized individuals need as much flotation assistance as can be derived from the craft. In recognizing this need, the applicant has designed the sail cradle such that it may double as a flotation device in the event of emergency.

The applicant has invented a device wherein a small sailboat having a detachable sail, mast, and boom may be transported in an efficient and secure manner, protecting both the boat and the mast and, in general, promoting the use and safety of small sailboats for recreational purposes.

SUMMARY OF THE INVENTION

A sail cradle for aiding in the transportation and storage during transportation of a detachable boom, sail and mast comprising an elongated stem having a bottom end within the mast hole and a top end extending above the deck surface, the top end including a cradle portion having a C-ring integrally connected therewith, the C-ring having an opening facing directly away from the stem for captivating releasable engagement of the furled mast, boom and sail, and the bottom end including a sealed hollow portion such that the cradle doubles as a flotation device in an emergency.

DESCRIPTION OF THE DRAWINGS

FIG. 1 is a perspective partially sectional view of the sail cradle in use;

FIG. 2 is an enlarged side view of the sail cradle shown in FIG. 1;

FIG. 3 is a frontal view of the sail cradle shown in FIG. 2;

FIG. 4 is a top plan view of the sail cradle.

FIG. 5 is a side elevation view of the closure at the bottom of the device seen in FIG. 4.

DESCRIPTION OF THE PREFERRED EMBODIMENT

Referring to the drawings wherein like reference characters designate like or corresponding parts throughout the several views and referring particularly to FIG. 2, there is shown the invention, a sail cradle, generally denoted by the numeral 10 having a stem 12 with a lower end 14 and an upper end 16. The upper end 16 includes a cradle portion 18 for captivating engagement of the boom 20, mast 22 and sail 24 more clearly seen in FIG. 1.

Referring now to FIG. 3, there is shown the invention 10 having an upper end 16 with the cradle portion 18 comprising a flexible and resilient C-shaped ring having an open portion facing away from the stem end 16. In the embodiment shown in FIG. 3 in what is believed to be the most practical and best embodiment, the opening 26 is bisected by vertical axis 28. Thus, the cradle is upwardly opening and perpendicular to the horizontal rather than the vertical axis for captivating engagement of the boom, sail and mast as shown in FIG. 1. The stem is placed inside the mast hole 30 of boat 32 in side hull 34 until the bottom end 14 of stem 12 reaches the floor as shown at 36. The stem 12 is elongated such that the top end 16 extends above the deck 38 which may comprise a splash rail or other like components found in small sailboats. Thereby, the cradle 18 with its open portion extending upwardly is in position for captivating engagement of the sail, boom and mast as shown in FIG. 1.

While the preferred embodiment of the invention shown in the figures and particularly FIG. 4 shows the stem 12 positioned centrally about the opening 26 of cradle 18 in the top plan view, it is conceivable and practical that such may not always be the case and the opening may be at a slight eccentricity to the stem in certain embodiments within the scope and spirit of the invention.

In addition, it is anticipated that a cap 50 may seal the hollow stem 12 in coordination with the cradle portion 18 such that the sail cradle, made of a buoyant and water resistant material (such as a lightweight plastic), may act as a sealed flotation device which is capable of utility in an emergency.

In Use

When the sail, boom and mast are tied down with the main tie-down 40 as shown in FIG. 1, the members may be engaged in the opening for captivating release of the members at the user's desire. Once said operation is done, the boat 32 is in position for transportation by traveling means such as trailer 42 pulled by vehicle 44.

It will be noticed that the front end of the members 20, 22 and 24 as shown at 46 are above splash rail 38 and consequently relieve the pressure that the members would have asserted against the splash rail had the cradle described herein been absent.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination, a sailboat of the type sized to be transported on a trailer behind a vehicle, said sailboat having a removable mast having an upper end and a lower end, a deck with a hole sized to receive the lower end of the mast in upstanding relation when in use in the water, said deck being above the hull a predetermined first distance, a boom having a first end zone adapted to engage the mast when in use and a sail to be supported by the mast and the boom, said mast and boom being adapted to be positioned in parallel relation when not in use and said sail being adapted to be furled about said mast to provide a generally tubular package, a tubular stem of predetermined length and diameter, said length being greater than the first predetermined distance, said tubular stem having a bottom end, said bottom end being of a diameter sized to fit within the hole in the deck and to dwell upon the hull bottom after removal of the mast, an upper end zone on said stem, said upper end zone being at all times above the deck when said bottom end is in engagement with the hull bottom, said upper end zone comprising a cradle defining a generally C-shaped upwardly opening pocket, said pocket having a starboard and port arm, each of said arms curving from the stem outwardly and upwardly to a terminal end in spaced relation from one another and spaced from one another a distance less than the diameter of the package, said arms being of flexible yieldable material for resiliently opening to nest the package therein in snug relation for captivating receipt of the package composed of the boom, sail and mast when the sailboat is to be transported by a trailer over land, said lower end being normally open in use on land and said stem including a cap having an outer end surface of a diameter substantially equal to the diameter of the stem and an inwardly projecting portion of smaller diameter sized to engage the interior of the tubular stem defining a shoulder for close snug abutting relation to close the end of the stem.

* * * * *